(12) United States Patent
Akiyama et al.

(10) Patent No.: US 7,512,801 B1
(45) Date of Patent: Mar. 31, 2009

(54) AUTHENTICATION SYSTEM, AUTHENTICATION METHOD, SIGNING APPARATUS, SIGNING METHOD, CERTIFYING APPARATUS, CERTIFYING METHOD, AND A COMPUTER-READABLE RECORDING MEDIUM WITH A PROGRAM MAKING A COMPUTER EXECUTE THE METHOD RECORDING THEREIN

(75) Inventors: Ryota Akiyama, Kanagawa (JP); Seigo Kotani, Kanagawa (JP); Takayuki Hasebe, Kanagawa (JP); Takaoki Sasaki, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/406,087

(22) Filed: Sep. 24, 1999

(30) Foreign Application Priority Data

Mar. 30, 1999 (JP) ............................ 11-088233

(51) Int. Cl.
*H04L 9/00* (2006.01)
(52) U.S. Cl. .................................. 713/176; 713/161
(58) Field of Classification Search ................ 713/176, 713/161
See application file for complete search history.

(56) References Cited

U.S. PATENT DOCUMENTS

| | | | | |
|---|---|---|---|---|
| 5,299,197 A | * | 3/1994 | Schlafly | 370/477 |
| 5,359,659 A | * | 10/1994 | Rosenthal | 713/200 |
| 5,604,801 A | * | 2/1997 | Dolan et al. | 713/159 |
| 5,651,069 A | * | 7/1997 | Rogaway | 380/28 |
| 5,757,913 A | * | 5/1998 | Bellare et al. | 713/168 |
| 5,907,619 A | * | 5/1999 | Davis | 713/176 |
| 5,915,024 A | * | 6/1999 | Kitaori et al. | 713/176 |
| 6,009,524 A | * | 12/1999 | Olarig et al. | 726/10 |
| 6,023,509 A | * | 2/2000 | Herbert et al. | 705/76 |
| 6,157,721 A | * | 12/2000 | Shear et al. | 380/255 |

FOREIGN PATENT DOCUMENTS

JP HEI 6-315027 11/1994

* cited by examiner

*Primary Examiner*—Christopher J Brown
(74) *Attorney, Agent, or Firm*—Staas & Halsey LLP

(57) ABSTRACT

The authentication system has a signing station and a certifying station. The signing station divides the data to be transmitted into a plurality of data, a hash unit creates a plurality of authenticators by applying a different one-way function to each of the data. In the certifying station, a separating unit divides the data into a plurality of data, a hash unit creates a plurality of authenticators by applying a different one-way function to each data, and a comparing unit compares the authenticators prepared anew with the authenticators separated from the received data and checks the authentication of the data from the comparison.

15 Claims, 6 Drawing Sheets

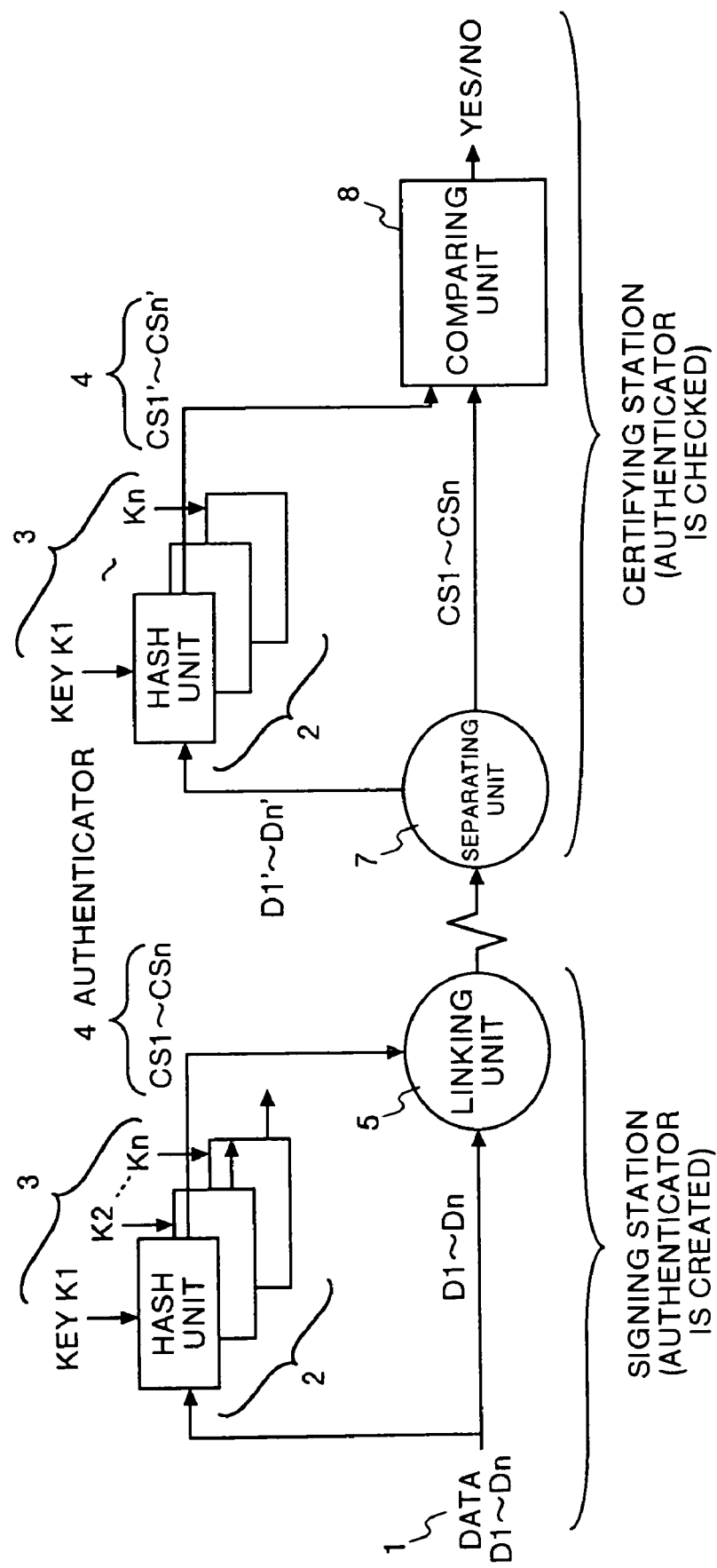

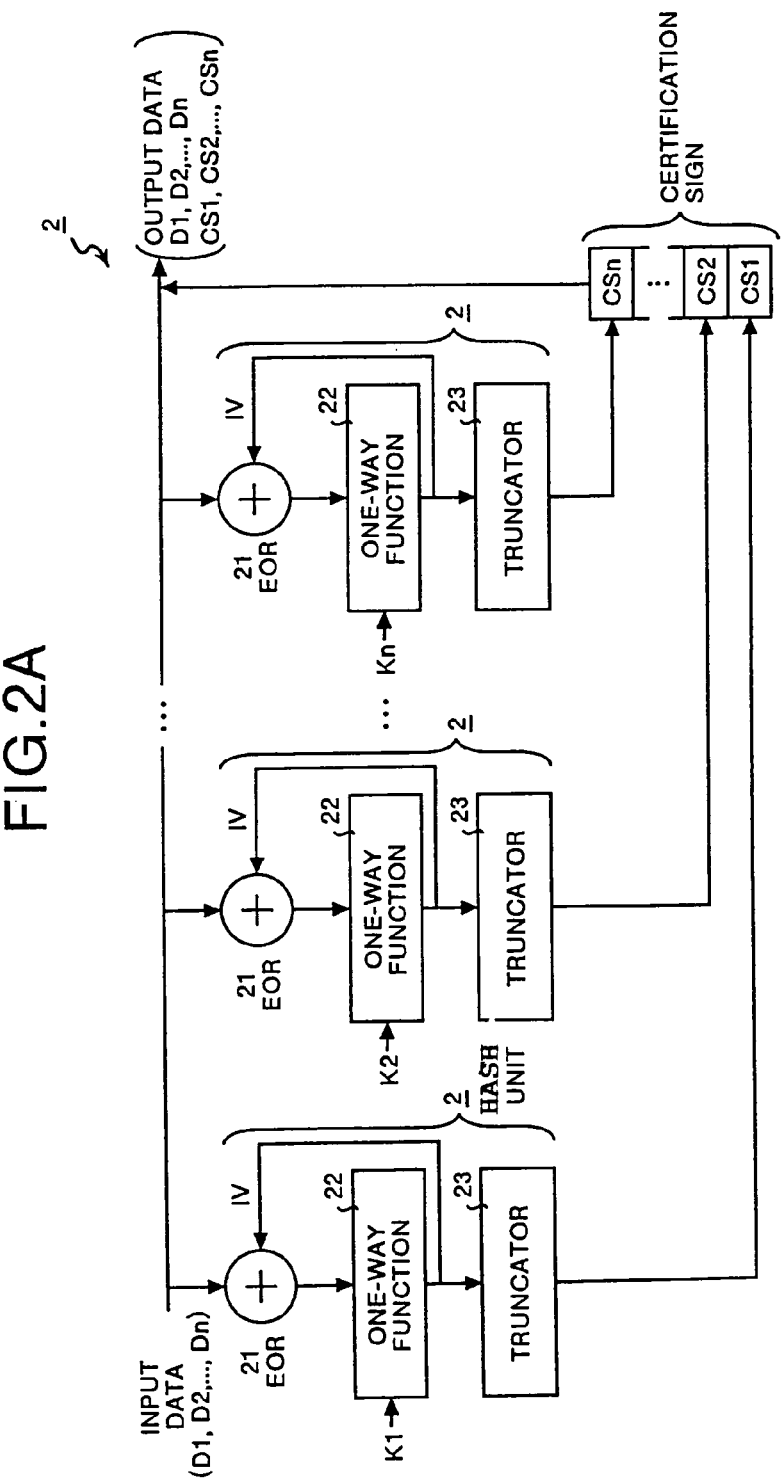

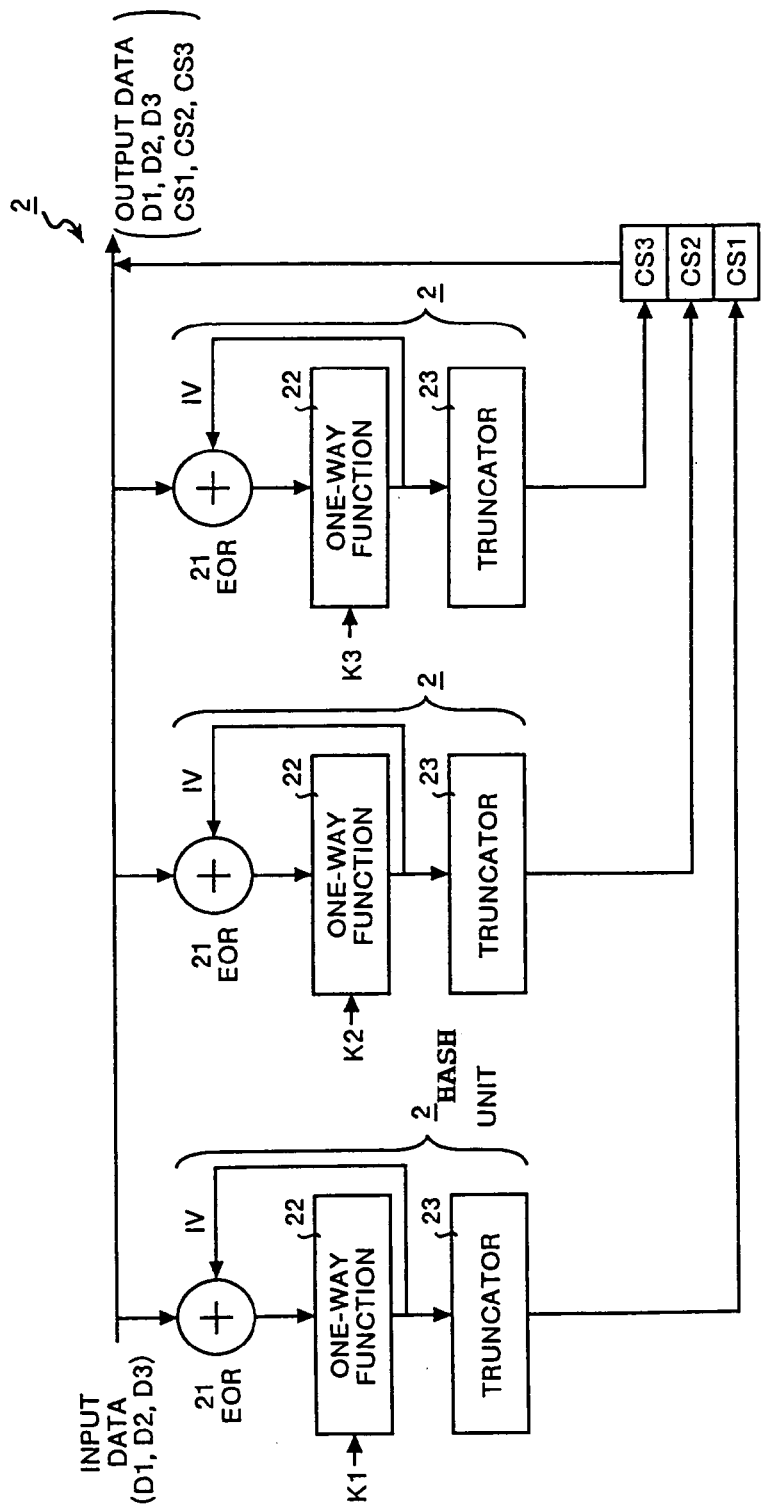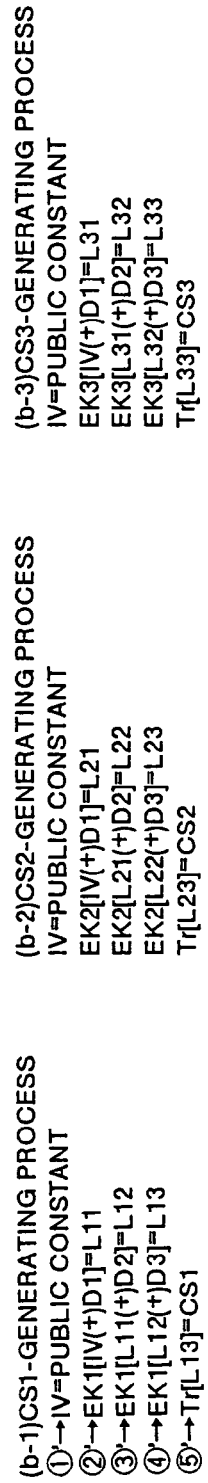
FIG. 3A
FIG. 3B

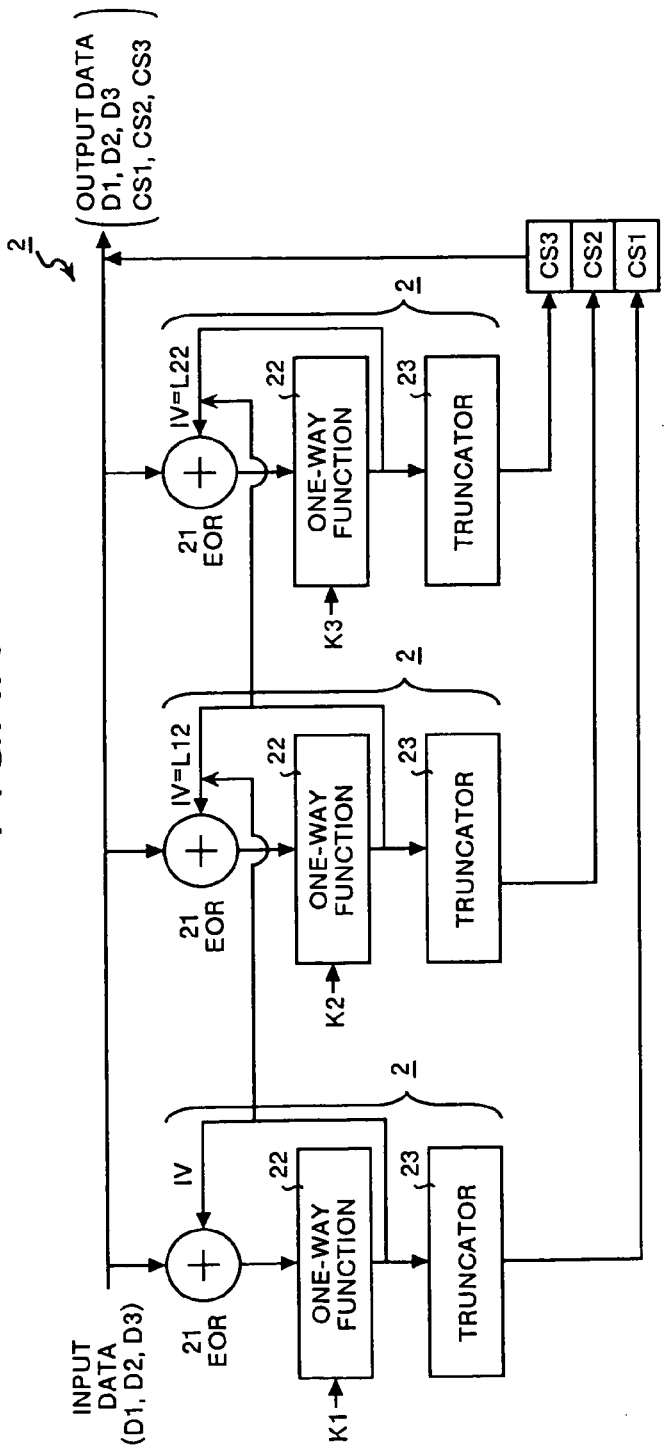
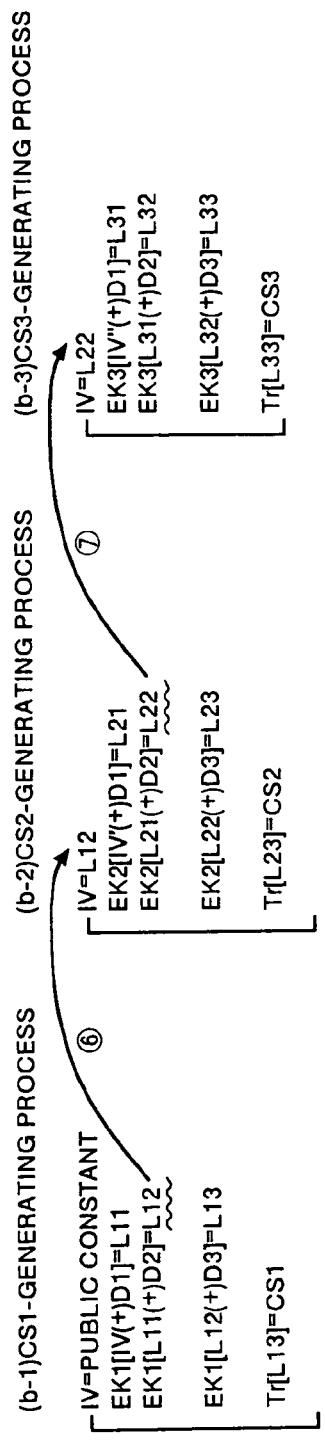
FIG.4A
FIG.4B

PRESENT INVENTION

CONVENTIONAL TYPE

AUTHENTICATION SYSTEM, AUTHENTICATION METHOD, SIGNING APPARATUS, SIGNING METHOD, CERTIFYING APPARATUS, CERTIFYING METHOD, AND A COMPUTER-READABLE RECORDING MEDIUM WITH A PROGRAM MAKING A COMPUTER EXECUTE THE METHOD RECORDING THEREIN

FIELD OF THE INVENTION

The present invention relates to an authentication system, an authentication method, a signing apparatus, a signing method, a certifying apparatus, a certifying method, and a recording medium for the same for creating an authenticator by applying a one-way function to electronic data, appending a signature to the electronic data and checking authentication of the electronic data using the authenticator. The invention more particularly relates to an authentication system, an authentication method, a signing apparatus, a signing method, a certifying apparatus, a certifying method, and a recording medium for the same which can efficiently prevent forgery of the authenticator.

BACKGROUND OF THE INVENTION

In association with recent development in the computer technology, there has increased an opportunity to accumulate electronic data such as a document prepared with characters, numerals, and strings of symbols in a database, or to transfer the data via a network. Considering these facts, how to avoid forgery of electronic data accumulated in a database or forgery of data during data communications has become a serious problem.

For solving the problem, there has been known an authentication technology in which an authenticator created by applying a one-way function to electronic data is appended thereto when the electronic data is transmitted and whether transmitted data is forged or not is verified using this authenticator when the electronic data is received.

More specifically, a station which transmits the electronic data (signing station) divides the electronic data into specified blocks, subjects the data to a signature processing by applying a one-way function such as a hash function to each of the divided data blocks, and transmits the data obtained through the processing to a distant station (certifying station). While a station which receives the electronic data creates an authenticator by applying a one-way function to a portion of the data other than the authenticator in the received electronic data, compares the created authenticator with the authenticator included in the electronic data, and verifies whether the electronic data has been forged or not.

However, even if the conventional technology described above is used, forgery of or tampering of electronic data can not possibly be verified if the portion of the authenticator itself is forged, namely if the signature is forged. Therefore, prevention of forgery of the signature becomes an issue that need to be resolved.

When a hash function is used, for example, it is possible to make more difficult to forgery of electronic data by making longer a processed block length of the hash function. However, it is not realistic to make the processed block length of the hash function extraordinarily long.

Especially, a conventional type of hash function is formed not based on an organized structural method but based on, in many cases, an empirical or an intuitive method obtained by combining a logical operation such as AND and OR with four rule of arithmetic in a complex manner. Therefore, enormous man power is required for experiments or the like when the block length of the hash function is to be increased.

SUMMARY OF THE INVENTION

It is an object of the present invention to provide, for the purpose of solving the problem described above, an authentication system, an authentication method, a signing apparatus, a signing method, a certifying apparatus, a certifying method, and a recording medium for the same which can efficiently prevent the forgery of the authenticator, when checking the authentication of the electronic data from an authenticator created using a one-way function.

With the present invention, a signing station creates a plurality of authenticators using a plurality of one-way functions then and links these plurality of authenticators to the electronic data, so that the length of the authenticators to be appended to the information can easily be made longer, which makes it possible to reduce a probability of misidentification of a forged authenticator.

With the present invention, the whole authenticator is not linked to the information, but only a portion of data obtained by truncating each of the authenticator is linked, which makes it more difficult for a third party to forge the authenticator.

With the present invention, a one-way operation is performed with the data using a different key, so that the length of the authenticators to be appended to the information can be made longer without utilizing a special one-way operation.

With the present invention, authenticators are discretely and independently prepared in parallel with each other, so that a plurality of authenticators can quickly be prepared.

With the present invention, an authenticator is prepared by utilizing intermediate data generated when other authenticator is created, so that generation of the authenticator is made more complicated, which makes it still difficult for a third party to forge the authenticator.

With the present invention, a signing station executes a step of preparing a plurality of authenticators by applying a different one-way function to each data, and a step of linking the created authenticators to the information, so that the length of the authenticators to be appended to the information can easily be made longer, which makes it possible to reduce a probability of misidentification of a forged authenticator.

With the present invention, there is a step of not linking the created whole authenticators to the information but linking only a portion of the data obtained by truncating each of the authenticators, which makes it more difficult for a third party to forge the authenticators.

With the present invention, there is a step of performing a one-way operation with the data using a different key, so that the length of the authenticators to be appended to the information can be made longer without utilizing a special one-way operation.

With the present invention, there are steps of discretely and independently creating the authenticators in parallel with each other, so that a plurality of authenticators can quickly be created.

With the present invention, there is a step of preparing the authenticator by utilizing an intermediate data generated when other authenticator is created, so that creation of the authenticator is made more complicated, which makes it still difficult for a third party to forge the authenticator.

With the present invention, the program stored in the recording medium makes a signing station execute a step of creating a plurality of authenticators by applying a different one-way function to each data, and a step of linking the created authenticators to the information, so that the length of the authenticators to be appended to the information can easily be made longer, which makes it possible to reduce a probability of misidentification of the forged authenticator.

Other objects and features of this invention will become understood from the following description with reference to the accompanying drawings.

BRIEF DESCRIPTION OF THE DRAWINGS

FIG. 1 shows a system configuration of the authentication system used in an embodiment of the present invention;

FIG. 2A and FIG. 2B show more specific configuration (independent and multi-parallel configuration) of the authentication system shown in FIG. 1;

FIG. 3A and FIG. 3B show a case where the authentication system shown in FIG. 1 operates independently in three parallel branches;

FIG. 4A shows configuration and FIG. 4B shows operation when the hash units 2 perform parallel processing in association with each other;

DESCRIPTION OF THE PREFERRED EMBODIMENTS

Figure 5:
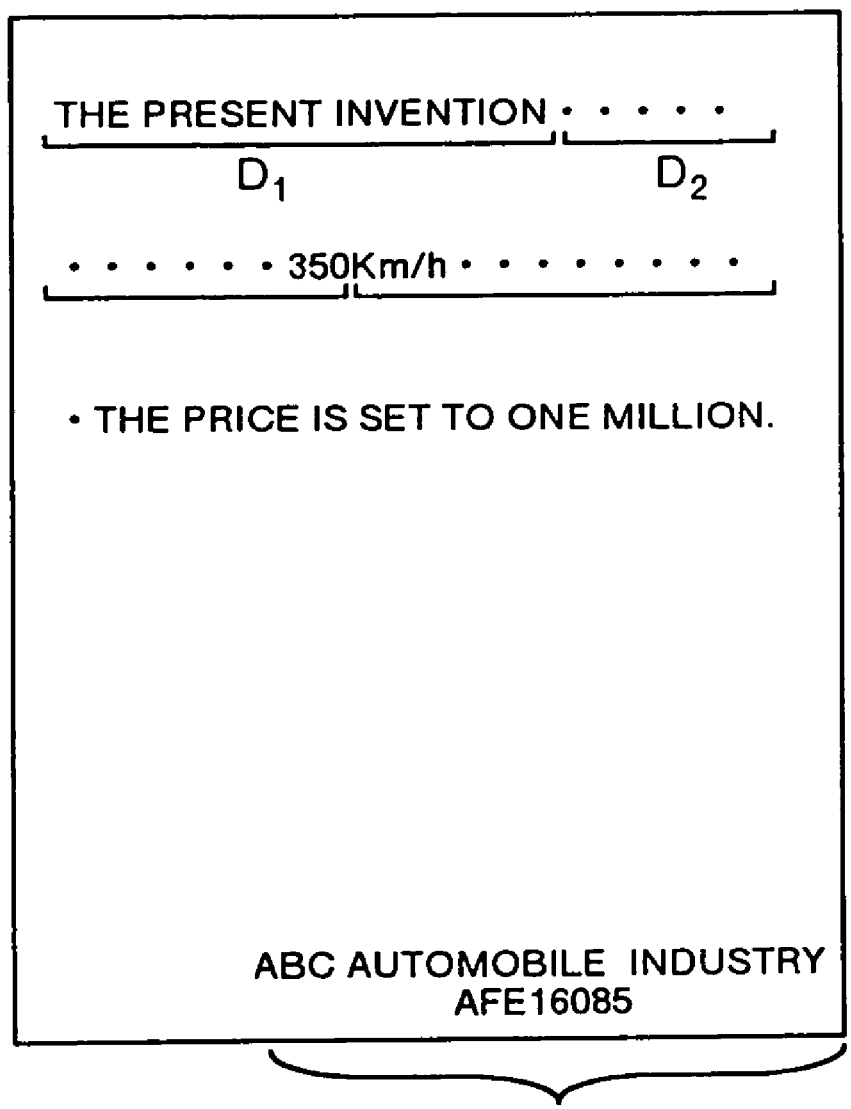
FIG. 5 is a view showing one example of a document as an object for processing.

Detailed description is made hereinafter for preferred embodiments of the present invention with reference to FIG. 1 to FIG. 6. It should be noted that this embodiment explains a case in which text data included in a document is the target data and an authenticator is created by applying a hash function to this target data.

FIG. 1 is a block diagram showing system configuration of the authentication system used in the embodiment of the present invention. In the left-hand side of FIG. 1 is a signature side (a signing station) which creates an authenticator by applying a hash function to the text data and links this authenticator to the text data before transmission. In the right-hand side of FIG. 1 is an authentication side (a certifying station) which creates an authenticator by applying a hash function to the data obtained by removing the authenticator from the received data, comparing the created authenticator with the authenticator included in the received data to check the correctness of the text data. Although it is assumed in this embodiment that a communication error will not occur in the process of transmission of data from the signing station to the certifying station. However, occurrence of error may be prevented by using an error-correction code or the like in some other cases.

At first, configuration of the signing station is described. As shown in FIG. 1, the signing station comprises a plurality of hash units 2 and keys 3, and a linking unit 5, and it is assumed that data 1 is input to this signing station.

The data 1 is text data as an object for transmission to the certifying station and consists of a plurality of data D1 to Dn obtained by dividing the data into each data with a size corresponding to a data length for a hash function. This data 1 is text data which contains numerals, characters, or symbols included in a document shown in FIG. 5, and, for example, "The present invention" shown in FIG. 5 corresponds to data D1.

The hash units 2 have one-way functions that converts, using keys K1 to Kn, the data D1 to Dn into authentication signs CS1 to CSn respectively, and they output the converted authentication signs CS1 to CSn to the linking unit 5. Although it is assumed that the hash units 2 perform processing corresponding to a known hash function in a protocol or the like for a method of verifying authentication signs based on the conventional technology, it is not always required that reverse conversion is ensured.

The keys 3 are the secret keys used when the hash units 2 perform scramble of one-way data compression, and authentication signs 4 are prepared by the hash units 2 according to the keys K1 to Kn.

The linking unit 5 links the authenticators 4 created by the hash units 2 to data D1 to Dn that should originally be transmitted, and the linked authenticators 4 are appended, for example, to the end of the document as shown in FIG. 5.

Next, configuration of the certifying station is described. As shown in FIG. 1, the certifying station comprises a separating unit 7, a plurality of hash units 2 and keys 3, and a comparing unit 8, and data received from the signing station is input to the certifying station.

The separating unit 7 separates the data received from the signing station into data D1' to Dn' and the authentication signs 4. The data D1' to Dn' is inputted into the hash units 2, while the authenticators 4 are inputted into the comparing unit 8.

The comparing unit 8 compares the authentication signs separated from the received data with the authenticators created from the data D1' to Dn'. The comparing unit 8 certifies that the data is authentic when the authenticators are coincident with each other, and certifies that the data is forged one when the authenticators are not coincident.

As described above, the authentication system according to this embodiment is so configured that a signing station prepares a plurality of authenticators CS1 to CSn using a plurality of hash units, so that a data length of authenticators can be made longer, which makes it difficult to forge the authenticator by a third party.

A sequence of processing by the signing station and the certifying station of the authentication system shown in FIG. 1 is described below.

(1) Creation of Authenticators in the Signature Station:

(1-1) The hash units 2 create CS1 to CSn each as the authenticators 4 by performing the processing of a one-way function using a key for each of input data D1 to Dn respectively into which the text data has been divided.

(1-2) The linking unit 5 links the authenticators CS1 to CSn created by the hash units 2 to the data D1 to Dn. As a result, for example, authenticators of 8 digits each consisting of 4 bits are appended, for example, to the end of the text as shown in the document of FIG. 5.

As described above, authenticators are created with a different key for each of the data D1 to Dn into which the text data has been divided, which makes it extremely difficult for a third party to forge the authenticator, thus reliability of text data being enhanced.

(2) Creation of Authenticators in the Certifying Station:

(2-1) The document shown in FIG. 5 prepared in the above step (1) is separated into the authenticators CS1 to Cn and data D1' to Dn'.

(2-2) The hash units 2 create CS1' to CSn' as the authenticators 4 for the separated data D1' to Dn' respectively by using a different key.

(2-3) The created authenticators CS1' to CSn' are compared with the separated authenticators CS1 to CSn, and whether the authenticators are coincident with each other or not is determined. When the authenticators are coincident, then the text data is recognized as not being forged, namely as an authentic one. On the other hand, when even a single authenticator is not coincident, then the text data is recognized as being a forged one.

As described above, the certifying station creates authenticators CS1' to CSn' each with a different key for each of the data D1' to Dn' separated from received data, compares the created authenticators CS1' to CSn' with the authenticators CS1 to CSn which are separated from the received data, determines the text data as an authentic one when it is determined that all the authenticators are coincident with each other, on the other hand, determines the text data as a forged one when even one authenticator is not coincident.

More specific configuration (independent and multi-parallel configuration) of the authentication system shown in FIG. 1 is described. FIG. 2 is a block diagram showing more specific configuration (independent and multi-parallel configuration) of the authentication system shown in FIG. 1. Herein a case is assumed in which authenticators CS1 to CSn are created concurrently as well as in parallel from each of the input data D1 to Dn by using a different key.

FIG. 2A shows configuration of the authentication system, and in FIG. 2A, input data D1 to Dn is data D1 to Dn into which the text data as an object for transmission is divided. The hash units 2 create the authenticators CS using the keys K. More specifically, each of the hash units 2 consists of an EOR 21, a one-way function 22 such as a hash function, and a truncator 23.

The EOR 21 executes an operation of an exclusive OR, and operates herein an exclusive OR between the input data and a value obtained in the one-way function 22 in the previous time (an initial value IV is used for the first time).

The one-way function (corresponds to a one-way function device) 22 creates an irreversible authenticator CS with the help of the one-way function from the data processed in the EOR 21 based on the key K.

The truncator 23 truncates the authenticator CS prepared by the one-way function 22 and outputs the truncated authenticator. When the authenticator created by the one-way function 22 is outputted as it is, data length of the authenticator is naturally increased. However, an increase in the data length of the authenticator CS does not increase the safety of data but it only increase the amount of data to be transmitted.

Therefore, the truncator 23 truncates a portion of the authenticator created by the one-way function 22 so that increase in a data length of the authenticator CS is made really useful. Even if the authenticator is truncated, a symbol space same as that in the case where the authenticator are transmitted without being truncated is formed, therefore, security of data is not possibly reduced. Further, the security surely increases due to the truncation, because a third party will not know where the authenticator is truncated.

Output data (D1 to Dn, CS1 to CSn) is obtained, as shown in FIG. 5, by linking the created authenticators CS1 to CSn to input data D1 to Dn.

FIG. 2B shows how the authenticator CS is generated, and a portion of the left of FIG. 2B shows especially how the authenticator CS1 is generated.

In the left portion in FIG. 2B,

① "IV=Public constant" indicates that a public constant is set as the initial value IV which is inputted into the EOR 21 forming a part of the hash unit 2 in the far left side of FIG. 2A.

② "EK1[IV(+)D1]=L11" indicates that the EOR 21 in FIG. 2A operates an exclusive OR between the initial value IV set in ① and the input data D1, and that the one-way function 22 performs a one-way operation (e.g., an operation by a hash function) with respect to the value obtained by operating the exclusive OR using the key K1 to obtain a value L11.

③ "EK1[L11(+)D2]=L12" indicates that the EOR 21 in FIG. 2A operates an exclusive OR between the value L11 obtained in ② and the second input data D2, and that the one-way function 22 performs a one-way operation (e.g., an operation by a hash function) with respect to the value obtained by operating the exclusive OR using the key K1 to obtain a value L12.

④ "EK1[L1(n−1)(+)Dn]=L1$n$" indicates that the EOR 21 in FIG. 2A operates, similarly as described above, an exclusive OR between the previously obtained value L1 (n−1) and n-th data Dn, and that the one-way function 22 performs a one-way operation (e.g., an operation by a hash function) with respect to the value obtained by operating the exclusive OR using the key K1 to obtain a value L1$n$.

⑤ "Tr[L1$n$]=CS1" indicates that, when the operation is performed with respect to the last i.e. the n-th data Dn, a result of the last operation is outputted as the authenticator CS1.

Thus, the authenticator CS1 can be created by using the key 1 and initial value IV through the sequence of ① to ⑤ described above.

The central and the right portions of FIG. 2B respectively show, similarly to the sequence of ① to ⑤ in the left portion, sequence of computing the authenticators CS2 and CS3 respectively. By repeating the same operation, authenticators up to CSn can also be computed.

As described above, it is possible to concurrently compute authentication signs CS1 to CSn by using the keys K1 to Kn independently in n parallel branches. Herein, a forgery probability per CSn is $\frac{1}{2}^{np}$ (where p is a bit length of the authentication sign). This forgery probability can be reduced by increasing a number of authenticators CS. Even if a number of authenticators CS is increased, because the processing is done parallel, a time required for the processing does not change.

Next, a configuration as well as an operation is described when n=3 (independent triple-parallel configuration) in FIG. 2A and FIG. 2B with reference to FIG. 3A and FIG. 3B. FIG. 3A is a view showing a case where the authentication system shown in FIG. 1 operates independently in three parallel branches.

FIG. 3A shows configuration of a case where n in FIG. 2A is set to 3. The same reference numerals as those in FIG. 2A are assigned to the hash units 2, the EOR 21, the one-way function 22, and the truncator 23, and detailed description thereof is omitted herein.

FIG. 3B shows how the authenticators CS1 to CS3 are generated in the hash units 2. Especially, the left portion of FIG. 3B shows a sequence of processing when the authenticator CS1 is created from the input data D1 to D3, the key K1, and initial value IV shown in FIG. 3A.

In the left portion in FIG. 3B,

①' "IV=Public constant" indicates that a public constant is set as the initial value IV which is inputted into the EOR 21 in the first hash unit 2 from the left side of FIG. 3A.

②' "EK1[IV(+)D1]=L11" indicates that the EOR 21 in FIG. 3A operates an exclusive OR between the initial value IV set in ①' and the first input data D1, and that the one-way function 22 performs a one-way operation (e.g., an operation by a hash function) with respect to the value obtained by operating the exclusive OR using the key K1 to obtain a value L11.

③' "EK1[L11(+)D2]=L12" indicates that the EOR 21 in FIG. 3A operates an exclusive OR between the value L11 obtained in ②' and the second input data D2, and that the one-way function 22 performs a one-way operation (e.g., an operation by a hash function) with respect to the value obtained by operating the exclusive OR using the key K1 to obtain a value L12.

④' "EK1[L12(+)D3]=L13" indicates that the EOR 21 in FIG. 3A operates, similarly as described above, an exclusive OR between the previously obtained value L12 and 3rd data D3, and that the one-way function 22 performs a one-way operation (e.g., an operation by a hash function) with respect to the value obtained by operating the exclusive OR using the key K1 to obtain a value L1n.

⑤' "Tr[L13]=CS1" indicates that, when the operation is performed with respect to the last i.e. 3rd data D3, a result of the 3rd operation is outputted as the authenticator CS1.

The central portion and the right portion of FIG. 3B respectively show, similarly to the sequence of ①' to ⑤' in left portion, sequence of computing authenticators CS2 and CS3.

Through the above mentioned sequence of ①' to ⑤', it is possible to concurrently and independently compute authenticators CS1 to CS3 by using the keys K1 to K3 respectively.

A case has been explained above in which the hash units 2 perform parallel processing in three branches concurrently and independently. However, the present invention is not limited to this and it may be applied to a case in which the hash units 2 perform parallel processing in association with each other and not concurrently.

The case in which the hash units 2 perform parallel processing in association with each other is explained here. FIG. 4A shows configuration and FIG. 4B shows operation when hash units 2 perform parallel processing in association with each other. More specifically, these figures show a case in which n is set to 3 and intermediate data in a previous stage is used as an initial value in the next stage.

FIG. 4A shows configuration of a case where n is set to 3 and intermediate data in a previous stage is used as the initial value in the next stage. The same reference numerals as those in FIG. 2A are assigned to the hash units 2, the EOR 21, the one-way function 22, and the truncator 23, and detailed description thereof is omitted herein.

This case is different from the case shown in FIG. 3A in that the initial value IV is set according to the intermediate data generated in other hash unit 2. The hash units 2 are so configured that as the initial value IV, intermediate data generated in other hash unit 2 is substituted. This configuration allows the authenticator CS to become more complicated, therefore, security is highly enhanced.

FIG. 4B shows how the authenticators CS1 to CS3 are generated in the hash units 2. Especially, the left portion of this figure shows a sequence of computing the authenticator CS1 in the hash unit 2 shown in the far left side of FIG. 4A. It should be noted that, the authenticator CS1 is computed through the same sequence as that from ①' to ⑤' of the left portion in FIG. 3B, therefore, intermediate data generated in other hash unit 2 is not used.

The central portion in FIG. 4B shows a sequence of computing the authenticator CS2 in the hash unit 2 second from the left side in FIG. 4A. Herein, the authenticator CS2 is computed by using an intermediate result (L12) shown by arrow ⑥ obtained in the previous stage as the initial value through the same sequence as that from ①' to ⑤' shown in the left portion of FIG. 3B. Namely, in this second hash unit 2, the intermediate data obtained in the first hash unit 2 is used.

The left portion of FIG. 4B shows a sequence of computing the authenticator CS3 in the hash unit 2 third from the left side in FIG. 4A. Herein, the authenticator CS3 is computed by using an intermediate result (L22) shown by arrow ⑦ obtained in the previous stage as the initial value through the same sequence as that from ①' to ⑤' shown in the left portion of FIG. 3B. Namely, in this third hash unit 2, the intermediate data obtained in the second hash unit 2 is used.

Through the above mentioned sequence, the hash units 2 are configured so as not to independently compute the authenticators CS1 to CS3 but to compute them in association with each other. This configuration allows a sequence of creation of the authenticators CS1 to CS3 to become more complicated, therefore, it becomes more difficult for a third party to forge the text data.

Figure 6A:
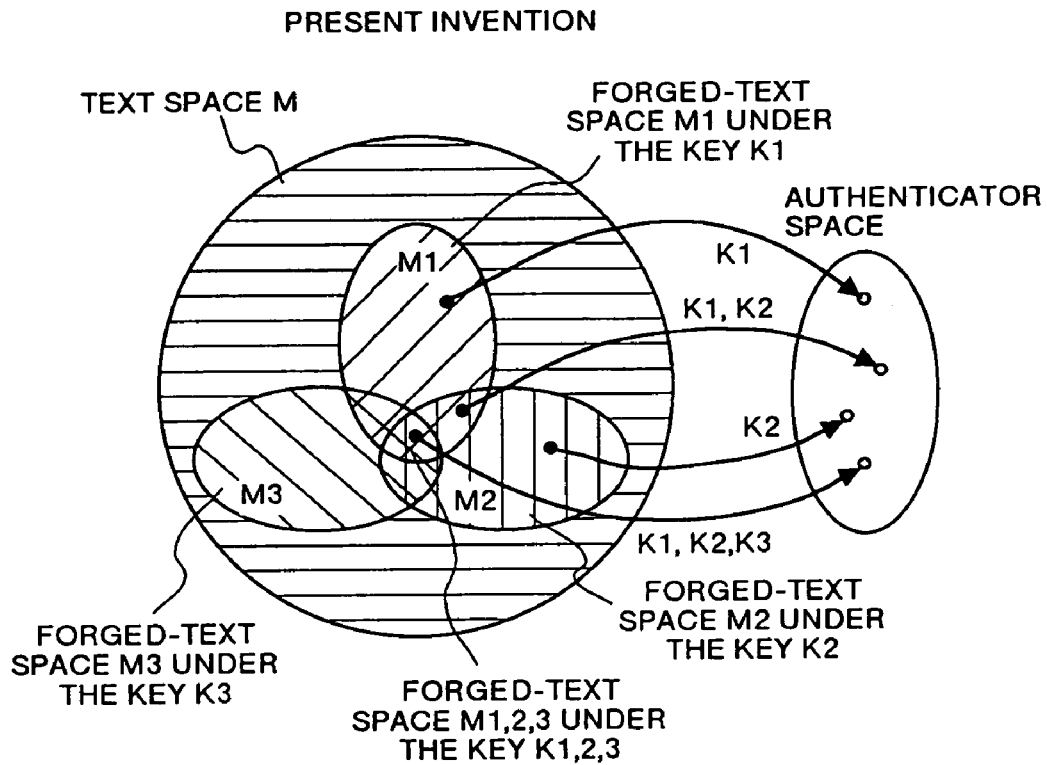
FIG. 6A and FIG. 6B explain the safety in the authentication system used in the embodiment.
Figure 6B:
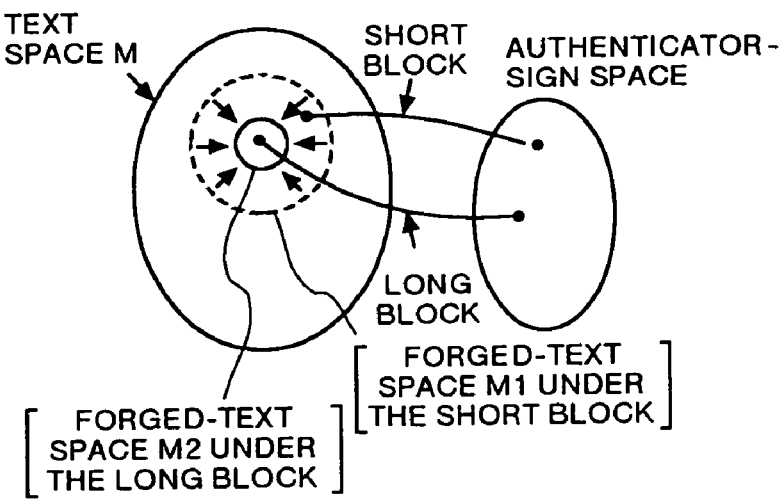

FIG. 6A and FIG. 6B are conceptual views for explaining safety of the authentication system used in this embodiment. FIG. 6A shows the concept of the present invention while FIG. 6B shows the concept of the conventional technology.

In FIG. 6B, a text space M is a virtual space possibly occupied by the text as an object to be forged, and the authenticator space is a virtual space possibly occupied by the authenticator. When the text space M corresponds to the authenticator space one to one, it becomes necessary to increase the block length of the authenticator in order to make smaller a forged text space M2 on the text space M in the manner shown with the circle indicated by a dotted line to the circle indicated by a solid line, so that a probability that the forged authenticator is by mistake recognized as the genuine authenticator is reduced.

However, as the block length of the authenticator depends on the processing block length of a hash function, the block length of the authenticator cannot be easily made longer.

Therefore, in the present invention, as shown in FIG. 6A, a forged space is made smaller by making use of a plurality of keys, so that the probability that the forged authenticator is by mistake recognized as the genuine authenticator is reduced. More specifically, assuming in FIG. 6A that a forged-text space on the text space M when the key K1 is used is M1, that a forged text space on the text space M when the key K2 is used is M2, and that a forged text space on the text space M when the key K3 is used is M3, and when the keys K1, K2, and K3 according to the present invention are used, the space for forgery is a space for forgery M123 which is extremely small and it is the area commonly shared by the spaces for forgery M1, M2, and M3, thus a probability that the data can be forged becomes still smaller.

As described above, in the present invention, the signing station creates a plurality of authenticators using a plurality of one-way functions then and links these plurality of authenticators to the electronic data, while the certifying station compares the authenticators created from the electronic data which is separated from the received data with the authenticators included in this received data, and verifies whether the electronic data is a forged one or not. Therefore, with the present invention, even when the electronic data is a forged one, the probability of misidentification that the forged data may be erroneously recognized as an authentic data can greatly and easily be reduced, further, the probability of misidentification can be reduced through parallel processing without increasing the time required for preparing authenticators.

Furthermore, as the authenticator is truncated using a truncator, the probability of misidentification of a forged authenticator can further be reduced without increasing the amount of data required for the authenticator to be appended to the electronic data. In addition, intermediate data obtained when the authenticator is created in a previous stage is used as the initial value in the next stage, which allows the probability of misidentification to further be reduced.

The above description assumes that the object for processing is text data in a document. However, the present invention is not limited to the above case, but is also applicable to various types of multimedia data such as image data, video data, or audio data. In addition, although it has been described above that a hash function is used as a one-way function, the present invention is not limited to the above case, and any one-way function other that the hash function may be used.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A signing apparatus, including a processor, used in an authentication system which uses authentication data created by applying one-way functions to information divisible into a plurality of data divisions thereof, the apparatus comprising:
   a dividing unit which divides the information into the plurality of data divisions;
   an authenticator creating unit which creates a first authenticator by applying a first one-way function using a first key to all of the data divisions, and creates a second authenticator by applying a second one-way function using a second key to each all of the data divisions, where the first and second keys are different; and
   an appending unit which links the first and second authenticators, and appends linked authenticators to the information for sending with the information to a certifying apparatus in the authentication system,
   wherein the dividing unit divides the information into the plurality of data divisions including a first data division and a second data division, each having a pre-specified length, and
   the authenticator creating unit creates the first authenticator by applying the first one-way function using the first key to a first initial value and one of the data divisions to obtain a first result and by applying the first one-way function using the first key to the first result obtained by previous application of the first one-way function and each of the other data divisions respectively, and creates the second authenticator by applying the second one-way function using the second key to a second initial value and the first one of the data divisions to obtain a second result and by applying the second one-way function using the second key to the second result obtained by previous application of the second one-way function and each of the other data divisions respectively.

2. The signing apparatus according to claim 1, wherein the appending unit appends authenticators obtained by truncating the first and second authenticators to the information.

3. The signing apparatus according to claim 1, wherein the first and second one-way functions discretely and independently create the first and second authenticators in parallel.

4. The signing apparatus according to claim 1, wherein intermediate data created by the first one-way function during its one-way operations is used by the second one-way function as the second initial value to create the second authenticator.

5. A certifying apparatus, including a processor, used in an authentication system which uses authentication data created by applying one-way functions to information divisible into a plurality of data divisions, the apparatus comprising:
   a separating unit which separates out the information and linked authenticators from authenticator-appended information which is received from a signing apparatus in the authentication system;
   a dividing unit which divides the information separated out by the separating unit into the plurality of data divisions;
   an authenticator creating unit which creates a first authenticator by applying a first one-way function using a first key to all of the data divisions, and creates a second authenticator by applying a second one-way function using a second key to all of the data divisions, where the first and second keys are different; and
   a certifying unit which authenticates the information by comparing the first authenticator with a third authenticator of the linked authenticators separated out by the separating unit, and by comparing the second authenticator with a fourth authenticator of the linked authenticators separated out by the separating unit, wherein
   the dividing unit divides the information separated out by the separating unit into the plurality of data divisions including a first data division and a second data division, each having a pre-specified length, and
   the authenticator creating unit creates the first authenticator by applying the first one-way function using the first key to a first initial value and one of the data divisions to obtain a first result and by applying the first one-way function using the first key to the first result obtained by previous application of the first one-way function and each of the other data divisions respectively, and creates the second authenticator by applying the second one-way function using the second key to a second initial value and one of the data divisions to obtain a second result and by applying the second one-way function using the second key to the second result obtained by previous application of the second one-way function and each of the other data divisions respectively.

6. The certifying apparatus according to claim 5, wherein the separating unit obtains truncated authenticators from the data received from the signing apparatus, and the certifying unit compares an authenticator obtained by truncating the first authenticator with the truncated third authenticator separated out by the separating unit, and compares an authenticator obtained by truncating the second authenticator with the truncated fourth authenticator separated out by the separating unit.

7. The certifying apparatus according to claim 5, wherein the first and second one-way functions discretely and independently create the authenticators in parallel.

8. The certifying apparatus according to claim 5, wherein intermediate data created by the first one-way function during its one-way operations is used by the second one-way function as the second initial value to create the second authenticator.

9. A signing method used in an authentication system which uses authentication data created by applying one-way functions to information divisible into a plurality of data divisions, the method comprising:
   dividing the information into the plurality of data divisions;
   creating a first authenticator by applying a first one-way function using a first key to all of the data divisions;
   creating a second authenticator by applying a second one-way function using a second key to all of the data divisions, where the first and second keys are different; and
   appending linked authenticators, the linked authenticators being obtained by linking the first and second authenticators, to the information for sending with the information to a certifying apparatus in the authentication system, wherein the dividing the information into the plurality of data divisions including a first data division and a second data division, each having a pre-specified length, and wherein the creating the first authenticator by applying the first one-way function using the first key to a first initial value and one of the data divisions to obtain a first result and by applying the first one-way function using the first key to the first result obtained by previous application of the first one-way function and each of the other data divisions respectively, and creates the second authenticator by applying the second one-way function using the second key to a second initial value and the first one of the data divisions to obtain a second result and by applying the second one-way function using the second key to the second result obtained by previous application of the second one-way function and each of the other data divisions respectively.

10. A certifying method used in an authentication system which uses authentication data created by applying one-way functions to information divisible into a plurality of data divisions, the method comprising:

separating out the information and linked authenticators from authenticator-appended information which is received from a signing apparatus in the authentication system;

dividing the separated out information into the plurality of data divisions;

creating a first authenticator by applying a first one-way function using a first key to all of the data divisions;

creating a second authenticator by applying a second one-way function using a second key to all of the data divisions, where the first and second keys are different; and authenticating the information by comparing the first authenticator with a third authenticator of the linked authenticators, and by comparing the second authenticator with a fourth authenticator of the linked authenticators, wherein the dividing the information into the plurality of data divisions including a first data division and a second data division, each having a pre-specified length, and wherein the creating the first authenticator by applying the first one-way function using the first key to a first initial value and one of the data divisions to obtain a first result and by applying the first one-way function using the first key to the first result obtained by previous application of the first one-way function and each of the other data divisions respectively, and creates the second authenticator by applying the second one-way function using the second key to a second initial value and the first one of the data divisions to obtain a second result and by applying the second one-way function using the second key to the second result obtained by previous application of the second one-way function and each of the other data divisions respectively.

11. A computer program product stored on computer readable medium for signing in an authentication system which uses authentication data created by applying one-way functions to information divisible into a plurality of data divisions, the computer program product including computer executable instructions stored on a computer readable medium, wherein the instructions, when executed by a computer, cause a computer to perform a process, the process comprising:

dividing the information into the plurality of data divisions;

creating a first authenticator by applying a first one-way function using a first key to all of the data divisions;

creating a second authenticator by applying a second one-way function using a second key to all of the data divisions, where the first and second keys are different; and appending linked authenticators, the linked authenticators being obtained by linking the first and second authenticators, to the information for sending with the information to a certifying apparatus in the authentication system, wherein the dividing the information into the plurality of data divisions including a first data division and a second data division, each having a pre-specified length, and wherein the creating the first authenticator by applying the first one-way function using the first key to a first initial value and one of the data divisions to obtain a first result and by applying the first one-way function using the first key to the first result obtained by previous application of the first one-way function and each of the other data divisions respectively, and creates the second authenticator by applying the second one-way function using the second key to a second initial value and the first one of the data divisions to obtain a second result and by applying the second one-way function using the second key to the second result obtained by previous application of the second one-way function and each of the other data divisions respectively.

12. A computer program product stored on computer readable medium for certifying in an authentication system which uses authentication data created by applying one-way functions to information divisible into a plurality of data divisions, the computer program product including computer executable instructions stored on a computer readable medium, wherein the instructions, when executed by a computer, cause a computer to perform a process, the process comprising:

separating out the information and linked authenticators from authenticator-appended information received from a signing apparatus in the authentication system;

dividing the separated out information into the plurality of data divisions;

creating a first authenticator by applying a first one-way function using a first key to all of the data divisions;

creating a second authenticator by applying a second one-way function using a second key to all of the data divisions, where the first and second keys are different; and authenticating the information by comparing the first authenticator with a third authenticator of the linked authenticators, and by comparing the second authenticator with a fourth authenticator of the linked authenticators, wherein the dividing the information into the plurality of data divisions including a first data division and a second data division, each having a pre-specified length, and wherein the creating the first authenticator by applying the first one-way function using the first key to a first initial value and one of the data divisions to obtain a first result and by applying the first one-way function using the first key to the first result obtained by previous application of the first one-way function and each of the other data divisions respectively, and creates the second authenticator by applying the second one-way function using the second key to a second initial value and the first one of the data divisions to obtain a second result and by applying the second one-way function using the second key to the second result obtained by previous application of the second one-way function and each of the other data divisions respectively.

13. An authentication system, including a processor, using authentication data created by applying one-way functions to information divisible into a plurality of data divisions, the system comprising:
- a signing apparatus which includes
- a first dividing unit which divides the information into the plurality of data divisions;
- an authenticator creating unit which creates a first authenticator by applying a first one-way function using a first key to all of the data divisions, and which creates a second authenticator by applying a second one-way function using a second key to all of the data divisions, where the first and second keys are different; and
- an appending unit which links the first and second authenticators, and appends the linked authenticators to the information for sending with the information to a certifying apparatus in the authentication system; and
- a certifying apparatus which includes
- a separating unit which separates out the information and linked-authenticators from the authenticator-appended information which is received from the signing apparatus in the authentication system;
- a second dividing unit which divides the information separated out by the separating unit into the plurality of data divisions;
- an authenticator creating unit which creates a first authenticator by applying a first one-way function using a first key to all of the data divisions, and creates a second authenticator by applying a second one-way function using a second key to all of the data divisions, where the first and second keys are different; and
- a certifying unit which authenticates the information by comparing the first authenticator with a third authenticator of the linked authenticators separated by the separating unit, and by comparing the second authenticator with a fourth authenticator of the linked authenticators separated by the separating unit,
- wherein the dividing the information into the plurality of data divisions including a first data division and a second data division, each having a pre-specified length, and
- wherein the creating the first authenticator by applying the first one-way function using the first key to a first initial value and one of the data divisions to obtain a first result and by applying the first one-way function using the first key to the first result obtained by previous application of the first one-way function and each of the other data divisions respectively, and creates the second authenticator by applying the second one-way function using the second key to a second initial value and the first one of the data divisions to obtain a second result and by applying the second one-way function using the second key to the second result obtained by previous application of the second one-way function and each of the other data divisions respectively.

14. An authentication method used in an authentication system which uses authentication data created by applying one-way functions to information divisible into a plurality of data divisions, the method comprising:
- dividing the information into the plurality of data divisions;
- creating a first authenticator by applying a first one-way function using a first key to all of the data divisions;
- creating a second authenticator by applying a second one-way function using a second key to all of the data divisions, where the first and second keys are different;
- appending linked authenticators, the linked authenticators being obtained by linking the first and second authenticators, to the information for sending with the information to a certifying apparatus in the authentication system;
- sending the authenticator-appended information;
- receiving and separating out the information and linked authenticators from the sent authenticator-appended information;
- dividing the separated-out information into the plurality of data divisions;
- creating a first authenticator by applying a first one-way function using a first key to all of the data divisions;
- creating a second authenticator by applying a second one-way function using a second key to all of the data divisions, where the first and second keys are different; and
- authenticating the information by comparing the first authenticator with a third authenticator, of the linked authenticators, and by comparing the second authenticator with a fourth authenticator of the linked authenticators,
- wherein the dividing the information into the plurality of data divisions including a first data division and a second data division, each having a pre-specified length, and
- wherein the creating the first authenticator by applying the first one-way function using the first key to a first initial value and one of the data divisions to obtain a first result and by applying the first one-way function using the first key to the first result obtained by previous application of the first one-way function and each of the other data divisions respectively, and creates the second authenticator by applying the second one-way function using the second key to a second initial value and the first one of the data divisions to obtain a second result and by applying the second one-way function using the second key to the second result obtained by previous application of the second one-way function and each of the other data divisions respectively.

15. A computer program product stored on computer readable medium for authentication in an authentication system which uses authentication data created by applying one-way functions to information divisible into a plurality of data divisions, the computer program product including computer executable instructions stored on a computer readable medium, wherein the instructions, when executed by a computer, cause a computer to perform a process, the process comprising:
- dividing the information into the plurality of data divisions;
- creating a first authenticator by applying a first one-way function using a first key to all of the data divisions;
- creating a second authenticator by applying a second one-way function using a second key to all of the data divisions, where the first and second keys are different;
- appending linked authenticators, the linked authenticators being obtained by linking the first and second authenticators, to the information for sending with the information to a certifying apparatus in the authentication system;
- sending the authenticator-appended information;
- receiving and separating out the information and linked authenticators from the sent authenticator-appended information;
- dividing the separated-out information into the plurality of data divisions;
- creating a first authenticator by applying a first one-way function using a first key to all of the data divisions;
- creating a second authenticator by applying a second one-way function using a second key to all of the data divisions, where the first and second keys are different;

authenticating the information by comparing the first authenticator with a third authenticator, of the linked authenticators, and by comparing the second authenticator with a fourth authenticator of the linked authenticators, wherein the dividing the information into the plurality of data divisions including a first data division and a second data division, each having a pre-specified length, and wherein the creating the first authenticator by applying the first one-way function using the first key to a first initial value and one of the data divisions to obtain a first result and by applying the first one-way function using the first key to the first result obtained by previous application of the first one-way function and each of the other data divisions respectively, and creates the second authenticator by applying the second one-way function using the second key to a second initial value and the first one of the data divisions to obtain a second result and by applying the second one-way function using the second key to the second result obtained by previous application of the second one-way function and each of the other data divisions respectively.

* * * * *

UNITED STATES PATENT AND TRADEMARK OFFICE
CERTIFICATE OF CORRECTION

| | | |
|---|---|---|
| PATENT NO. | : 7,512,801 B1 | Page 1 of 1 |
| APPLICATION NO. | : 09/406087 | |
| DATED | : March 31, 2009 | |
| INVENTOR(S) | : Ryota Akiyama et al. | |

It is certified that error appears in the above-identified patent and that said Letters Patent is hereby corrected as shown below:

Title Page, Item (54) Title: Line 8, change "RECORDING" to --RECORDED--.

Column 1 (Title), Line 8, change "RECORDING" to --RECORDED--.

Signed and Sealed this

Second Day of June, 2009

JOHN DOLL
*Acting Director of the United States Patent and Trademark Office*